(12) United States Patent
Oh et al.

(10) Patent No.: US 11,450,281 B2
(45) Date of Patent: Sep. 20, 2022

(54) STAGE AND SCAN DRIVER INCLUDING THE SAME

(71) Applicant: Samsung Display Co., Ltd., Yongin-si (KR)

(72) Inventors: Soo Hee Oh, Yongin-si (KR); Chui Kyu Kang, Yongin-si (KR); Dong Sun Lee, Yongin-si (KR); Sang Moo Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/245,316

(22) Filed: Apr. 30, 2021

(65) Prior Publication Data

US 2021/0248963 A1 Aug. 12, 2021

Related U.S. Application Data

(63) Continuation of application No. 16/570,476, filed on Sep. 13, 2019, now Pat. No. 10,997,922.

(30) Foreign Application Priority Data

Nov. 23, 2018 (KR) .................. 10-2018-0146558

(51) Int. Cl.
  *G09G 3/3266* (2016.01)
  *G09G 3/3291* (2016.01)
  *G06F 1/08* (2006.01)
(52) U.S. Cl.
  CPC ............. *G09G 3/3266* (2013.01); *G06F 1/08* (2013.01); *G09G 3/3291* (2013.01); *G09G 2310/0267* (2013.01)

(58) Field of Classification Search
  None
  See application file for complete search history.

(56) References Cited

U.S. PATENT DOCUMENTS

| 8,723,765 | B2 | 5/2014 | Kang et al. | |
|---|---|---|---|---|
| 9,013,390 | B2 | 4/2015 | Yang et al. | |
| 9,548,026 | B2 | 1/2017 | Jang | |
| 2002/0075249 | A1* | 6/2002 | Kubota | G09G 3/3677 345/204 |
| 2008/0062097 | A1* | 3/2008 | Jeong | G09G 3/3266 377/64 |
| 2009/0058790 | A1* | 3/2009 | Chiang | G11C 19/28 377/64 |

(Continued)

FOREIGN PATENT DOCUMENTS

| KR | 10-2014-0025149 A | 3/2014 |
|---|---|---|
| KR | 10-2017-0143052 A | 12/2017 |

(Continued)

OTHER PUBLICATIONS

Non-Final Office Action dated Sep. 3, 2020, in U.S. Appl. No. 16/570,476.

(Continued)

*Primary Examiner* — Dorothy Harris
(74) *Attorney, Agent, or Firm* — H.C. Park & Associates, PLC

(57) ABSTRACT

A stage and a scan driver including the same for supplying a scan signal using a stage formed of P-type transistors to prevent output of an unwanted noise in a period where the scan signal is not supplied.

12 Claims, 8 Drawing Sheets

(56) References Cited

U.S. PATENT DOCUMENTS

| | | | |
|---|---|---|---|
| 2009/0128476 A1* | 5/2009 | Lee | G11C 19/28 345/98 |
| 2010/0177023 A1* | 7/2010 | Han | G11C 19/184 377/79 |
| 2010/0188316 A1 | 7/2010 | Jang | |
| 2013/0181747 A1 | 7/2013 | Yoon et al. | |
| 2014/0055436 A1* | 2/2014 | Han | H03K 17/687 327/109 |
| 2015/0213746 A1* | 7/2015 | Kim | G11C 19/28 345/215 |
| 2017/0004775 A1* | 1/2017 | Chen | G09G 3/3233 |
| 2017/0287404 A1* | 10/2017 | Kim | G09G 3/3291 |
| 2017/0365211 A1* | 12/2017 | Lee | G09G 3/3275 |
| 2018/0330673 A1 | 11/2018 | Kang et al. | |

FOREIGN PATENT DOCUMENTS

| | | |
|---|---|---|
| KR | 10-1813215 B1 | 1/2018 |
| KR | 10-2018-0125670 A | 11/2018 |

OTHER PUBLICATIONS

Notice of Allowance dated Jan. 8, 2021, in U.S. Appl. No. 16/570,476.

* cited by examiner

STAGE AND SCAN DRIVER INCLUDING THE SAME

CROSS-REFERENCE TO RELATED APPLICATION

This application is a Continuation of U.S. patent application Ser. No. 16/570,476, filed Sep. 13, 2019, which claims priority from and the benefit of Korean Patent Application No. 10-2018-0146558 filed on Nov. 23, 2018, which are incorporated by reference for all purposes as if fully set forth herein.

BACKGROUND

Field

The present invention relates to a stage and a scan driver including the stage.

Discussion of the Background

In general, a display device includes a data driver for supplying data signals to data lines, a scan driver for supplying scan signals to scan lines, and a pixel array including pixels disposed in a region partitioned by scan lines and data lines. Pixels included in the pixel array are selected to receive the data signal from the data line when the scan signal is supplied to the scan line. The pixels receiving the data signal supply light having a luminance level corresponding to the data signal to the outside. The scan driver has stages connected to the scan lines. Stages supply the scan signal to the scan line connected to the stages corresponding to signals from the timing controller.

The pixels included in the organic light emitting diode display device may be implemented with N-type transistors (for example, NMOS) and P-type transistors (for example, PMOS) in order to minimize the leakage current. However, it is difficult to obtain drive reliability when the stage is implemented with N-type transistors. Accordingly, a stage that is formed of P-type transistors and supplies the scan signal of a high level is required. In addition, in a case where the scan signal is unstable, a data signal may be supplied to the pixel at an undesired time. Therefore, a stage capable of generating a stable scan signal is required.

The above information disclosed in this Background section is only for understanding of the background of the inventive concepts, and, therefore, it may contain information that does not constitute prior art.

SUMMARY OF THE INVENTION

Exemplary embodiments of the present invention provide a stage and a scan driver that can control the scan signal stably without noise while the scan signal is not being supplied.

Exemplary embodiments of the present invention also provide a stage that can generate a stable scan signal and a scan driver including the same.

Additional features of the inventive concepts will be set forth in the description which follows, and in part will be apparent from the description, or may be learned by practice of the inventive concepts.

An exemplary embodiment of the present invention provides a stage including a first transistor having a first electrode connected to a first input terminal and a gate electrode connected to a second input terminal receiving a first clock signal; an output circuit connected to the second input terminal and a second power input terminal for supplying a scan signal to an output terminal corresponding to voltages of a first node and a second node; an input circuit connected to a second electrode of the first transistor and a third input terminal for controlling voltages of a third node and a fourth node; a first signal processing circuit for controlling the voltage of the first node corresponding the voltage of the second node; a second signal processing circuit connected to the fourth input terminal and the fifth node for controlling the voltage of the first node corresponding to a signal supplied to a first power input terminal; a third signal processing circuit connected to the first power input terminal and the fourth input terminal for controlling the voltage of a sixth node corresponding to the voltages of the second node and the third node; a first stabilization circuit connected between the second signal processing circuit and the third signal processing circuit for limiting a voltage drop of the third node and the fourth node; and a second stabilization circuit connected between the first node and the fourth node for limiting a voltage drop of the fourth node and the second node.

Transistors included in the output circuit, the input circuit, the first signal processing circuit, the second signal processing circuit, the third signal processing circuit, the first stabilization circuit, the second stabilization circuit and the first transistor may be P-type transistors.

The first power input terminal may receive a first power set to a gate-off voltage, and the second power input terminal may receive a second power set to a gate-on voltage.

The first input terminal may receive an output signal or a start pulse of previous stage.

The output signal of the previous stage or the start pulse may at least once overlap a first clock signal supplied to the second input terminal.

The third input terminal may receive a first control clock signal, and the fourth input terminal may receive a second control clock signal.

The first control clock signal and the second control clock signal may have the same cycle and a second clock signal may be set to a signal shifted by half a cycle from the first control clock signal.

High voltage of the first clock signal may overlap low voltage of both the first control clock signal and the second control clock signal.

The first stabilization circuit may include a second transistor connected between the third node and the fifth node and having a gate electrode connected to the second power input terminal.

The second stabilization circuit may include a third transistor connected between the second node and the fourth node and having a gate electrode connected to the second power input terminal.

The input circuit may include a seventh transistor connected between the second electrode and the fourth node of the first transistor and having a gate electrode connected to the third input terminal; an eighth transistor connected between the third node and the third input terminal and having a gate electrode connected to the fourth node; and a ninth transistor connected between the third node and the second power input terminal and having a gate electrode connected to the third input terminal.

The output circuit may include a tenth transistor connected between the second input terminal and the output terminal and having a gate electrode connected to the first node; and an eleventh transistor connected between the second power input terminal and the output terminal and having a gate electrode connected to the second node.

The first signal processing circuit may include a twelfth transistor connected between the second input terminal and the first node and having a gate electrode connected to the second node; and a third capacitor connected between the second input terminal and the first node.

The second signal processing circuit may include a second capacitor having a first terminal connected to the fifth node; a fifth transistor connected between a second terminal of the second capacitor and the first node and having a gate electrode connected to the fourth input terminal; and a sixth transistor connected between the second terminal of the second capacitor and the fourth input terminal and having a gate electrode connected to the fifth node.

The third signal processing circuit may include a thirteenth transistor and a fourteenth transistor connected in series between the first power input terminal and the fourth node; and a first capacitor connected between a sixth node, which are common nodes of the thirteenth transistor and the fourteenth transistor, and a second node, and a gate electrode of the thirteenth transistor may be connected to the third node, and a gate electrode of the fourteenth transistor may be connected to the second node.

Another exemplary embodiment of the present invention provides a scan driver including a plurality of stages for supplying scan signals to scan lines, wherein each of the stages includes a first transistor having a first electrode connected to a first input terminal and a gate electrode connected to a second input terminal receiving a first clock signal; an output circuit connected to the second input terminal and a second power input terminal for supplying a scan signal to an output terminal corresponding to voltages of a first node and a second node; an input circuit connected to a second electrode of the first transistor and a third input terminal for controlling voltages of a third node and a fourth node; a first signal processing circuit for controlling the voltage of the first node corresponding the voltage of the second node; a second signal processing circuit connected to the fourth input terminal and the fifth node for controlling the voltage of the first node corresponding to a signal supplied to a first power input terminal; a third signal processing circuit connected to the first power input terminal and the fourth input terminal for controlling the voltage of a sixth node corresponding to the voltages of the second node and the third node; a first stabilization circuit connected between the second signal processing circuit and the third signal processing circuit for limiting a voltage drop of the third node and the fourth node; and a second stabilization circuit connected between the first node and the fourth node for limiting a voltage drop of the fourth node and the second node.

Transistors included in the output circuit, the input circuit, the first signal processing circuit, the second signal processing circuit, the third signal processing circuit, the first stabilization circuit and the second stabilization circuit and the first transistor and the first transistor may be a P-type transistor.

A second input terminal of a j-th stage (j is 1, 3, 5, . . . ) may receive a first clock signal, and a second input terminal of a j+1-th stage may receive a second clock signal.

The first clock signal and the second clock signal may have the same cycle and the second clock signal may be set to a signal shifted by half a cycle from the first clock signal.

The first stabilization circuit may include a second transistor connected between the third node and the fifth node and having a gate electrode connected to the second power input terminal, and the second stabilization circuit may include a third transistor connected between the second node and the fourth node having a gate electrode connected to the second power input terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
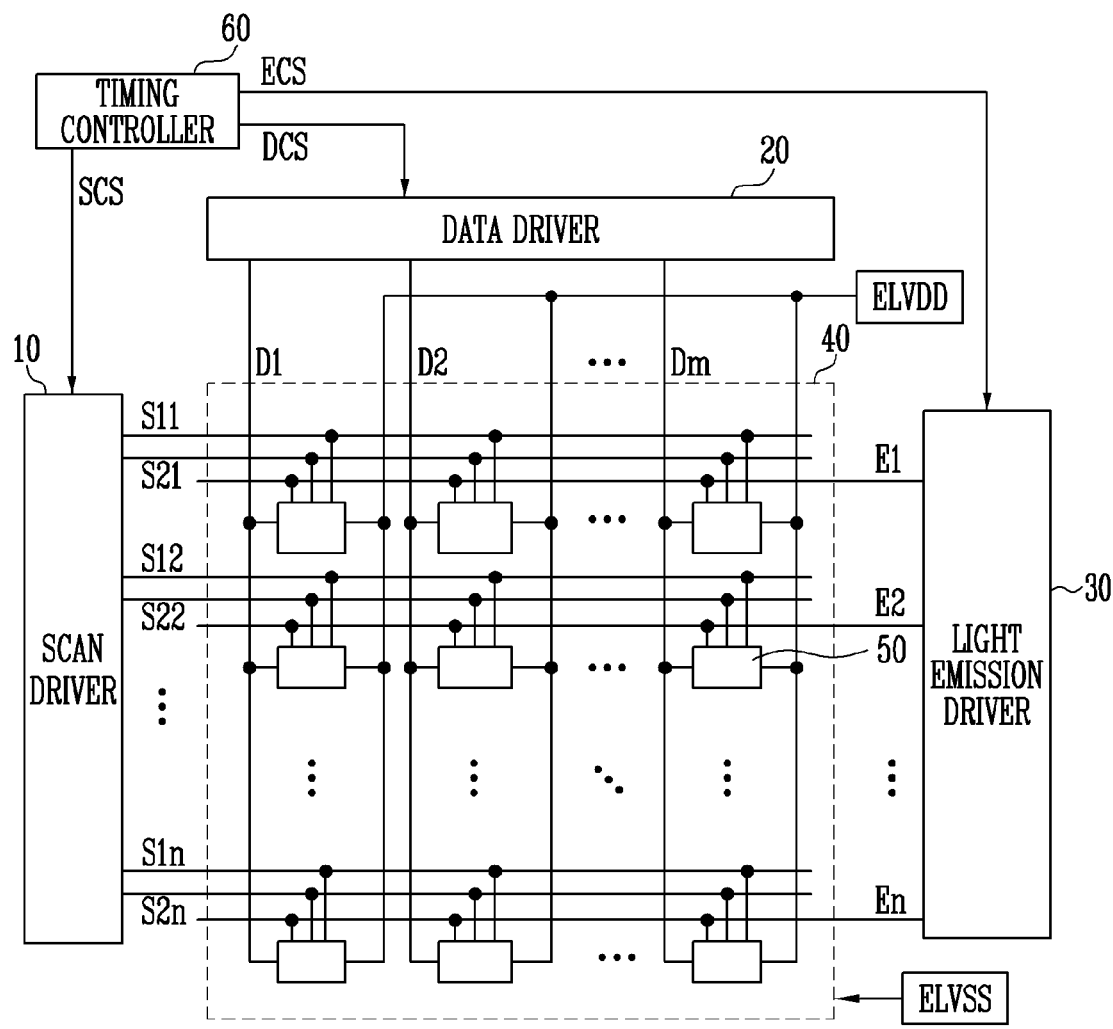
FIG. 1 is a drawing illustrating a display device according to exemplary embodiments of the present invention.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "connected to" another element, it may be directly connected to, or electrically connected to the other element, or intervening elements may be present. When, however, an element is referred to as being "directly connected to" another element, there are no intervening elements present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As is customary in the field, some exemplary embodiments are described and illustrated in the accompanying drawings in terms of functional blocks, units, circuits, and/or modules. Those skilled in the art will appreciate that these blocks, units, circuits, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, circuits, and/or modules being implemented by microprocessors or other similar hardware, they may be programmed and controlled using software (e.g., microcode) to perform various functions discussed herein and may optionally be driven by firmware and/or software. It is also contemplated that each block, unit, circuit, and/or module may be implemented by dedicated hardware, or as a combination of dedicated hardware to perform some functions and a processor (e.g., one or more programmed microprocessors and associated circuitry) to perform other functions. Also, each block, unit, circuit, and/or module of some exemplary embodiments may be physically separated into two or more interacting and discrete blocks, units, circuits, and/or modules without departing from the scope of the inventive concepts. Further, the blocks, units, circuits, and/or modules of some exemplary embodiments may be physically combined into more complex blocks, units, circuits, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a drawing illustrating a display device according to exemplary embodiments of the present invention.

Referring to FIG. 1, a display device according to an exemplary embodiment of the present invention includes a scan driver 10, a data driver 20, a pixel array 40, and a timing controller 60. In an exemplary embodiment, the display device may further include a light emission driver 30.

The timing controller 60 generates a data driving control signal DCS, a scan driving control signal SCS, and a light emitting driving control signal ECS in response to synchronous signals supplied the outside. The data driving control signal DCS generated at the timing controller 60 is supplied to the data driver 20, the scan driving control signal SCS is supplied to the scan driver 10, and the light emitting driving control signal ECS is supplied to the light emission driver 30.

The scan driving control signal SCS includes a gate start pulse and clock signals. The gate start pulse controls a first timing of the scan signal. The clock signals are used to shift the gate start pulse.

The light emitting driving control signal ECS includes a light emitting start pulse and clock signals. The light emitting start pulse controls a first timing of a light emission control signal. The clock signals are used to shift the light emitting start pulse.

The data driving control signal DCS includes a source start pulse and clock signals. The source start pulse controls a sampling starting point of data. The clock signals are used to control a sampling operation.

The scan driver 10 receives the scan driving control signal SCS from the timing controller 60. The scan driver 10, which receives the scan driving control signal SCS, supplies scan signals to first scan lines S11 to S1n and second scan lines S21 to S2n. For example, the scan driver 10 may sequentially supply a first scan signal to the first scan lines S11 to S1n and sequentially supply a second scan signal to the second scan lines S21 to S2n. When the first scan signal and the second scan signal are sequentially supplied, the pixel 50 is selected by a horizontal line unit.

The scan driver 10 supplies a second scan signal to the i-th (i is a natural number) second scan line S2i so as to overlap the first scan signal supplied to the i-th first scan line S1i. Here, the first scan signal and the second scan signal may be set to signals having opposite polarities. For example, the first scan signal may be set to low voltage, and the second scan signal may be set to high voltage.

In addition, the first scan signal and the second scan signal are set to a gate-on voltage. In this case, a transistor that is included in pixel 50 and receives the first scan signal is set to a turn-on state when the first scan signal is supplied. Similarly, a transistor that is included in pixel 50 and receives the second scan signal is set to turn-on state when the second scan signal is supplied.

The light emission driver 30 receives a light emitting driving control signal ECS from a timing controller 60. The light emission driver 30, which receives the light emitting driving control signal ECS, supplies light emission control signals to light emission control lines E1 to En. For example, the light emission driver 30 may sequentially supply a light emission control signal to light emission control lines E1 to En. This light emission control signal is used to control an emission time of pixels 50. For example, a specific pixel 50 receiving a light emission control signal may be set to a non-emission state during a period in which the emission control signal is supplied, and may be set to an emission state during the other periods.

In addition, a light emission control signal is set to a gate-off voltage (e.g., high voltage) at which a transistor included in pixels 50 can be turned off, and a scan signal is set to a gate-on voltage (e. g., low voltage) at which a transistor included in pixels 50 can be turned on.

The data driver 20 receives the data driving control signal DCS from the timing controller 60. The data driver 20, which receives the data driving control signal DCS, supplies data signals to the data lines D1 to Dm. The data signals supplied to the data lines D1 to Dm are supplied to the pixels 50 selected by the first scan signal (or the second scan signal). For this purpose, the data driver 20 may supply the data signals to the data lines D1 to Dm to be synchronized with the first scan signal (or the second scan signal).

The pixel array 40 has pixels 50 connected to scan lines S11 to S1n, S21 to S2n, data lines D1 to Dm, and light emission control lines E1 to En. The pixel array 40 receives a first driving power ELVDD, a second driving power ELVSS, and an initialization voltage Vint from the outside.

Each of the pixels 50 has a driving transistor and an organic light emitting diode not shown. The driving transistor controls an amount of current flowing from the first driving power ELVDD to the second driving power ELVSS via the organic light emitting diode in response to the data signal. Here, a gate electrode of the driving transistor may be initialized by a voltage of the initialization voltage Vint before the data signal is supplied.

On the other hand, n scan lines (S11 to S1n, S21 to S2n) and n light emission control lines E1 to En are shown in FIG. 1, but the inventive concepts are not limited thereto. For example, at least one dummy scan line and dummy light emission control line may be additionally formed in the pixel array 40 corresponding to a circuit structure of the pixels 50.

In addition, the first scan lines S11 to S1n and the second scan lines S21 to S2n are shown in FIG. 1, but the inventive concepts are not limited thereto. For example, only scan lines (i.e., S11 to S1n or S21 to S2n) of the first scan lines S11 to S1n and the second scan lines S21 to S2n may be included in the present invention corresponding to a circuit structure of the pixels 50.

Additionally, the light emission control lines E1 to En are shown in FIG. 1, but the inventive concepts are not limited thereto. For example, inverse light emission control lines not shown may be additionally formed corresponding to a circuit structure of the pixels 50. The inverted light emission control lines may receive an inverted light emission control signal that inverts the light emission control signal.

Figure 2:
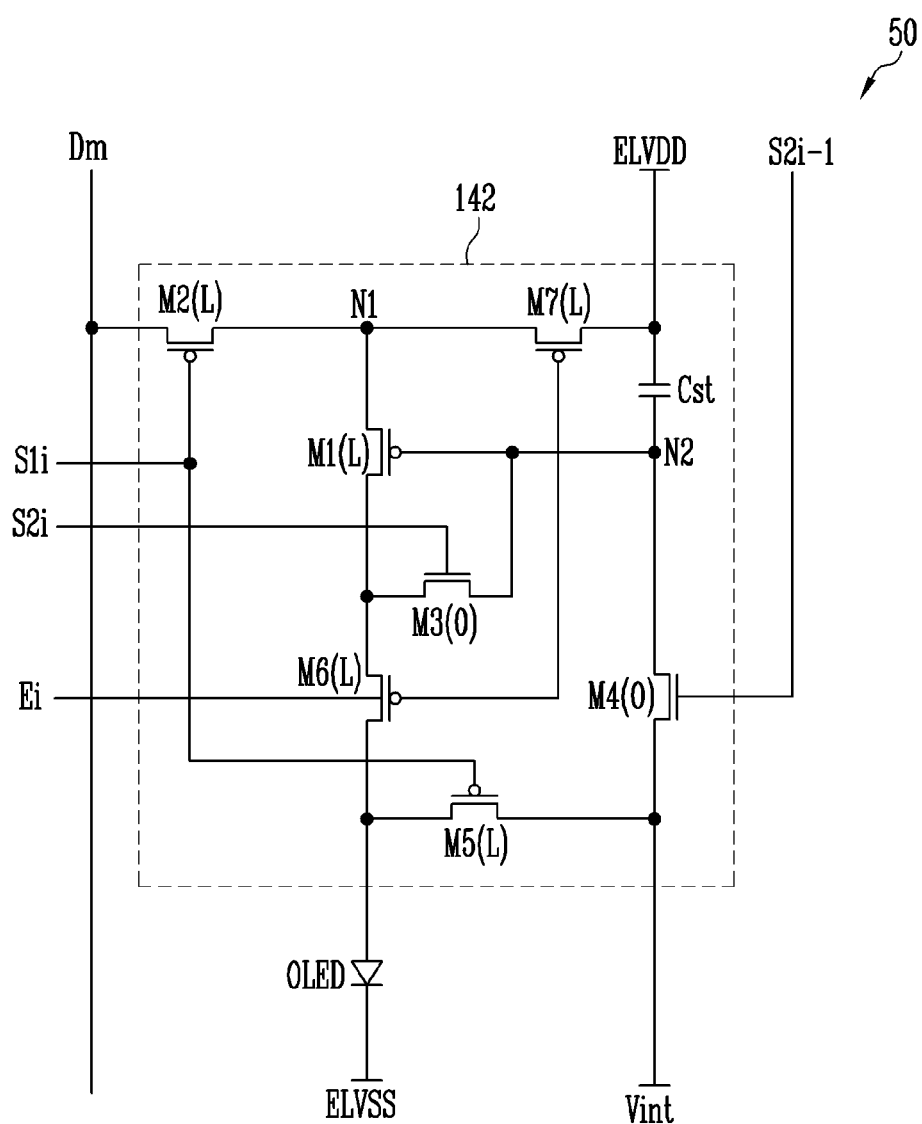
FIG. 2 is a drawing illustrating an exemplary embodiment of the pixel shown in FIG. 1.

FIG. 2 is a drawing illustrating an exemplary embodiment of the pixel shown in FIG. 1. FIG. 2 shows pixels connected to the n-th scan line Sn and the m-th data line Dm for convenience of description.

Referring to FIG. 2, the pixel 50 according to an exemplary embodiment of the present invention includes an oxide semiconductor thin film transistor and a low temperature poly-silicon (LTPS) thin film transistor.

The oxide semiconductor thin film transistor is capable of a low temperature process and has charge mobility lower than an LTPS thin film transistor. Such an oxide semiconductor thin film transistor has an excellent off current characteristic. The oxide semiconductor thin film transistor includes a gate electrode, a source electrode, and a drain electrode. The oxide semiconductor thin film transistor has an active layer formed of an oxide semiconductor. The oxide semiconductor may be formed of an amorphous or crystalline oxide semiconductor. The oxide semiconductor thin film transistor may be composed of an N-type transistor.

The LTPS thin film transistor has high charge mobility and, therefore, has fast driving characteristics. The LTPS thin film transistor includes a gate electrode, a source electrode and a drain electrode. The LTPS thin film transistor includes an active layer formed of polysilicon. The LTPS thin film transistor may be composed of a P-type thin film transistor or an N-type thin film transistor. In the present exemplary embodiment, the LTPS thin film transistor may be composed of the N-type transistor.

The pixel 50 includes a pixel circuit 142 and an organic light emitting diode OLED.

An anode of the organic light emitting diode OLED is connected to the pixel circuit 142 and a cathode is connected to the second driving power ELVSS. The organic light emitting diode OLED generates light of a predetermined luminance corresponding to an amount of current supplied from the pixel circuit 142.

The pixel circuit 142 controls the amount of current flowing from the first driving power ELVDD to the second driving power ELVSS via the organic light emitting diode OLED corresponding to the data signal. For this purpose, the pixel circuit 142 includes a first transistor M1 (L), a second transistor M2 (L), a third transistor M3 (O), a fourth transistor M4 (O), a fifth transistor M5 (L), a sixth transistor M6 (L), a seventh transistor M7 (L), and storage capacitor Cst.

A first electrode of the first transistor M1 (L) is connected to a first node N1, and a second electrode of the first transistor M1 (L) is connected to a first electrode of the sixth transistor M6 (L). The gate electrode of the first transistor M1 (L) is connected to a second node N2. The first transistor M1 (L) controls the amount of current supplied from the first driving power ELVDD to the second driving power ELVSS via the organic light emitting diode OLED corresponding to voltage stored in the storage capacitor Cst. To ensure a fast driving speed, the first transistor M1 (L) is formed of an LTPS thin film transistor. The first transistor M1 (L) is formed of a P-type transistor.

The second transistor M2 (L) is connected between the data line Dm and the first node N1. A gate electrode of the second transistor M2 (L) is connected to the i-th first scan line S1i. The second transistor M2 (L) is turned on when a first scan signal is supplied to the i-th first scan line S1i to electrically connect the data line Dm and the first node N1. The second transistor M2 (L) may be formed of an LTPS thin film transistor. The second transistor M2 (L) is formed of a P-type transistor.

The third transistor M3 (O) is connected between the second electrode of the first transistor M1 (L) and the second node N2. A gate electrode of the third transistor M3 (O) is connected to the i-th second scan line S2i. The third transistor M3 (O) is turned on when a second scan signal is supplied to the i-th second scan line S2i to connect the first transistor M1 (L) in diode form.

The third transistor M3 (O) is formed of an oxide semiconductor thin film transistor. In this case, the third transistor M3 (O) is formed of an N-type transistor. When the third transistor M3 (O) is formed of an oxide semiconductor thin film transistor, a leakage current flowing from the second node N2 to the second electrode of the first transistor M1 (L) is minimized, thereby displaying an image of a desired luminance.

The fourth transistor M4 (O) is connected between the second node N2 and the initialization voltage Vint. A gate electrode of the fourth transistor M4 (O) is connected to the i−1-th second scan line S2i−1. The fourth transistor M4 (O) is turned on when the second scan signal is supplied to the i−1-th second scan line S2i−1 to supply the voltage of the initialization voltage Vint to the second node N2.

The fourth transistor M4 (O) is formed by an oxide semiconductor thin film transistor. In this case, the fourth transistor M4 (O) is formed of an N-type transistor. When the fourth transistor M4 (O) is formed of an oxide semiconductor thin film transistor, a leakage current flowing from the second node N2 to the initialization voltage Vint is minimized, thereby displaying an image of a desired luminance.

The fifth transistor M5 (L) is connected between the anode of the organic light emitting diode (OLED) and the initialization voltage Vint. A gate electrode of the fifth transistor M5 (L) is connected to the i-th first scan line S1i. The fifth transistor M5 (L) is turned on when the first scan signal is supplied to the i-th first scan line S1i to supply the voltage of the initialization voltage Vint to the anode of the organic light emitting diode OLED. The fifth transistor M5 (L) may be formed of an LTPS thin film transistor. The fifth transistor M5 (L) is formed of a P-type transistor.

The sixth transistor M6 (L) is connected between the second electrode of the first transistor M1 (L) and the anode of the organic light emitting diode OLED. A gate electrode of the sixth transistor M6 (L) is connected to a light emission control line Ei. The sixth transistor M6 (L) is turned off when the light emission control signal is supplied to the light emission control line Ei, and is turned on when the light emission control signal is not supplied thereto. The sixth transistor M6 (L) may be formed of an LTPS thin film transistor. The sixth transistor M6 (L) is formed of a p-type transistor.

The seventh transistor M7 (L) is connected between the first driving power ELVDD and the first node N1. A gate electrode of the seventh transistor M7 (L) is connected to the light emission control line Ei. This seventh transistor M7 (L) is turned off when the light emission control signal is supplied to the light emission control line Ei, and is turned on when the light emission control signal is not supplied thereto. The seventh transistor M7 (L) may be formed of an LTPS thin film transistor. The seventh transistor M7 (L) is formed of a P-type transistor.

The storage capacitor Cst is connected between the first driving power ELVDD and the second node N2. The storage capacitor Cst stores a voltage corresponding to a threshold voltage of the data signal and the first transistor M1 (L).

In the above-described exemplary embodiment of the present invention, the third transistor M3 (O) and the fourth transistor M4 (O) connected to the second node N2 are formed as oxide semiconductor thin film transistors. Thus, when the third transistor M3 (O) and the fourth transistor M4 (O) are formed as oxide semiconductor thin film transistors, the leakage current from the second node N2 is minimized, thereby displaying an image of a desired luminance.

In addition, in the above-described exemplary embodiment of the present invention, the transistors M7 (L), M1 (L), and M6 (L) disposed in the current supply path for supplying a current to the organic light emitting diode OLED are formed as LTPS thin film transistors. In a case where the transistors M7 (L), M1 (L), and M6 (L) disposed in the current supply path are formed as LTPS thin film transistors, the current may be stably supplied to the organic light emitting diode OLED because of the fast driving characteristic.

On the other hand, in an exemplary embodiment of the present invention, the pixel 50 is not limited to FIG. 2, and may be implemented in various types of circuits.

Figure 3:
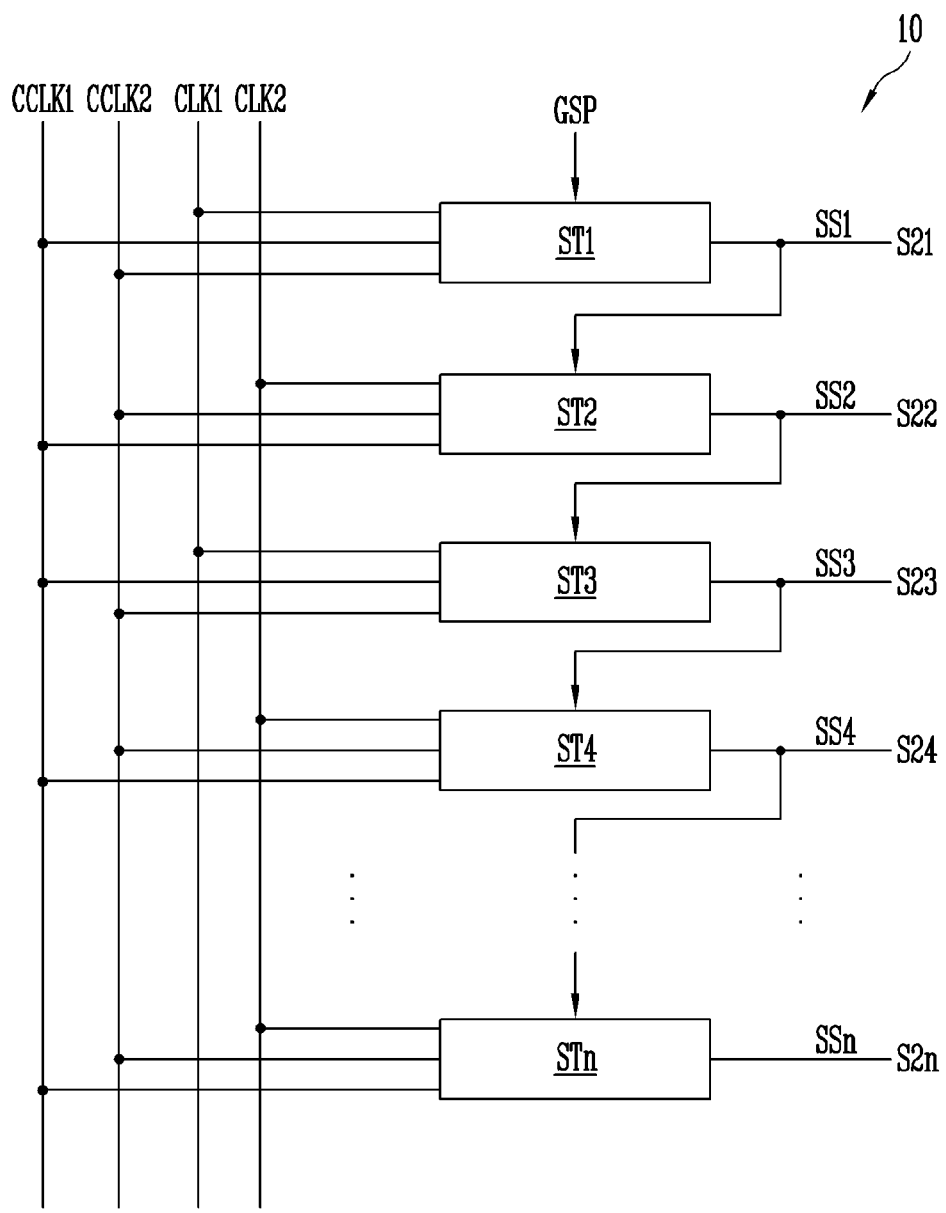
FIG. 3 is a drawing schematically illustrating a scan driver shown in FIG. 1.

FIG. 3 is a drawing schematically illustrating a scan driver shown in FIG. 1. FIG. 3 shows an example in which a scan driver 10 includes n (n is two or more natural number) stages ST. Hereinafter, the scan driver 10 for supplying a scan signal to a first scan lines S21 is shown.

Referring to FIG. 3, the scan driver 10 according to an exemplary embodiment of the present invention includes a plurality of stages ST1 to STn. Each of the stages ST1 to STn is connected to one of second scan lines S21 to S2n and supplies the scan signal SS to the second scan lines S12 to S2n in response to a gate start pulse GSP. Here, the i-th stage STi (i is a natural number) may supply the scan signal SSi to the i-th second scan line S2i.

The first stage ST1 supplies the scan signal SS1 to the second scan line S21 connected to itself in response to the gate start pulse GSP. The remaining stages ST2 to STn supplies scan signal (one of SS2 to SSn) to the second scan line (one of S21 to S2n) connected to itself corresponding to an output signal (i.e., a scan signal) supplied from a previous stage. For example, the i-th stage STi may supply the scan signal SSi to the i-th second scan line S2i corresponding to the scan signal SSi−1 supplied from the i-th stage STi−1.

The scan driving control signal SCS includes a first clock signal CLK1, a second clock signal CLK2, a first control clock signal CCLK1, and a second control clock signal CCLK2.

The first clock signal CLK1 and second clock signal CLK2 are supplied to different ones of stages ST1 . . . . STn. For example, the first clock signal CLK1 may be supplied to stage ST1, and the second clock signal CLK2 may be supplied to stage ST2. The first clock signal CLK1 and the second clock signal CLK2 are supplied to the second scan lines S21 to S2n as a scan signal SS.

Each of the first clock signal CLK1 and the second clock signal CLK2 is a square wave signal that repeats high voltage and low voltage. Here, a high voltage period in one cycle of the first clock signal CLK1 and the second clock signal CLK2 may be set shorter than a low voltage period. Here, the high voltage period may correspond to a width of the scan signal, and may be variously set corresponding to a circuit structure of the pixel 50. FIG.

The first clock signal CLK1 and the second clock signal CLK2 have the same cycle (e.g., 2H) and are set to a phase-shifted signal. For example, the first clock signal CLK1 and the second clock signal CLK2 may be shifted in phase by half a cycle compared to the previously supplied clock signal. In other words, when the first clock signal CLK1 and the second clock signal CLK2 are supplied sequentially, the second clock signal CLK2 may be set to be shifted in phase by half a cycle from the first clock signal CLK1.

The first control clock signal CCLK1 and the second control clock signal CCLK2 are supplied to the stages ST1 to STn. The first control clock signal CCLK1 and the second control clock signal CCLK2 are used as control signals to control the operation of the stages ST1 to STn.

Each of the first control clock signal CCLK1 and the second control clock signal CCLK2 is a square wave signal that repeats high voltage and low voltage. For example, the first control clock signal CCLK1 and the second control clock signal CCLK2 have the same cycle (e.g., 2H) and are set to a phase-shifted signal. Here, the second control clock signal CCLK2 may be shifted in phase by half a cycle compared to the first control clock signal CCLK1. A high voltage period in each cycle of the first control clock signal CCLK1 and the second control clock signal CCLK2 may be set longer than a low voltage period.

In addition, the high voltage period of clock signals CLK1 and CLK2 may be set so that a width thereof overlaps the low voltage period of the first control clock signal CCLK1 and the second control clock signal CCLK2.

Figure 4:
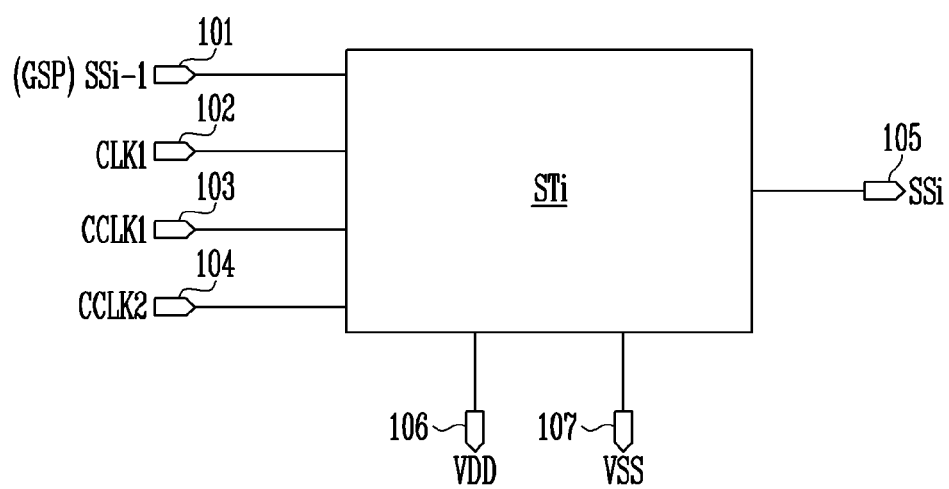
FIG. 4 is a drawing illustrating an exemplary embodiment of a connection terminal of a stage shown in FIG. 3.

FIG. 4 is a drawing illustrating an exemplary embodiment of a connection terminal of a stage shown in FIG. 3. FIG. 4 shows the i-th stage STi for convenience of description.

Referring to FIG. 4, a stage STi according to an exemplary embodiment of the present invention includes a first input terminal 101, a second input terminal 102, a third input terminal 103, a fourth input terminal 104, an output terminal 105, a first power input terminal 106, and a second power input terminal 107.

The first input terminal 101 receives a scan signal SSi−1 from the i-th stage STi−1. Here, when the i-th stage STi is set to a first stage ST1, a gate start pulse GSP is supplied to the first input terminal 101.

The second input terminal 102 receives the first clock signal CLK1. The second input terminal 102 is electrically connected to the output terminal 105 during at least some period of one frame period corresponding to a driving of the i-th stage STi. At this time, high voltage of the first clock signal CLK1 supplied to the second input terminal 102 is supplied to the i-th second scan line S2i as a scan signal SSi.

The third input terminal 103 receives the first control clock signal CCLK1. In this case, the second control clock signal CCLK2 is supplied to the third input terminal 103 of the i−1-th stage STi−1.

The fourth input terminal 104 receives the second control clock signal CCLK2. In this case, the first control clock signal CCLK1 is supplied to the fourth input terminal 104 of the i-th stage STi−1.

The output terminal 105 outputs the scan signal SSi of the i-th stage STi. The scan signal SSi output to the output terminal 105 is supplied to the i-th second scan line S2i.

The first power input terminal 106 is connected to first power VDD and second power input terminal 107 is connected to second power VSS. Here, the first power VDD is set to a gate-off voltage, and the second power VSS is set to a gate-on voltage. The gate-off voltage is the voltage at which a transistor included in the i-th stage STi is turned off, and the gate-on voltage is the voltage at which a transistor included in the i-th stage STi are turned on. For this purpose, the first power VDD may be set to a higher voltage than the second power VSS.

In the exemplary embodiment of the present invention, the high voltage of the clock signals CLK1, CLK2, CCLK1, and CCLK2 may be set to a gate-off voltage (e.g., VDD), and the low voltage thereof may be set to a gate-on voltage (e.g., VSS).

Figure 5:
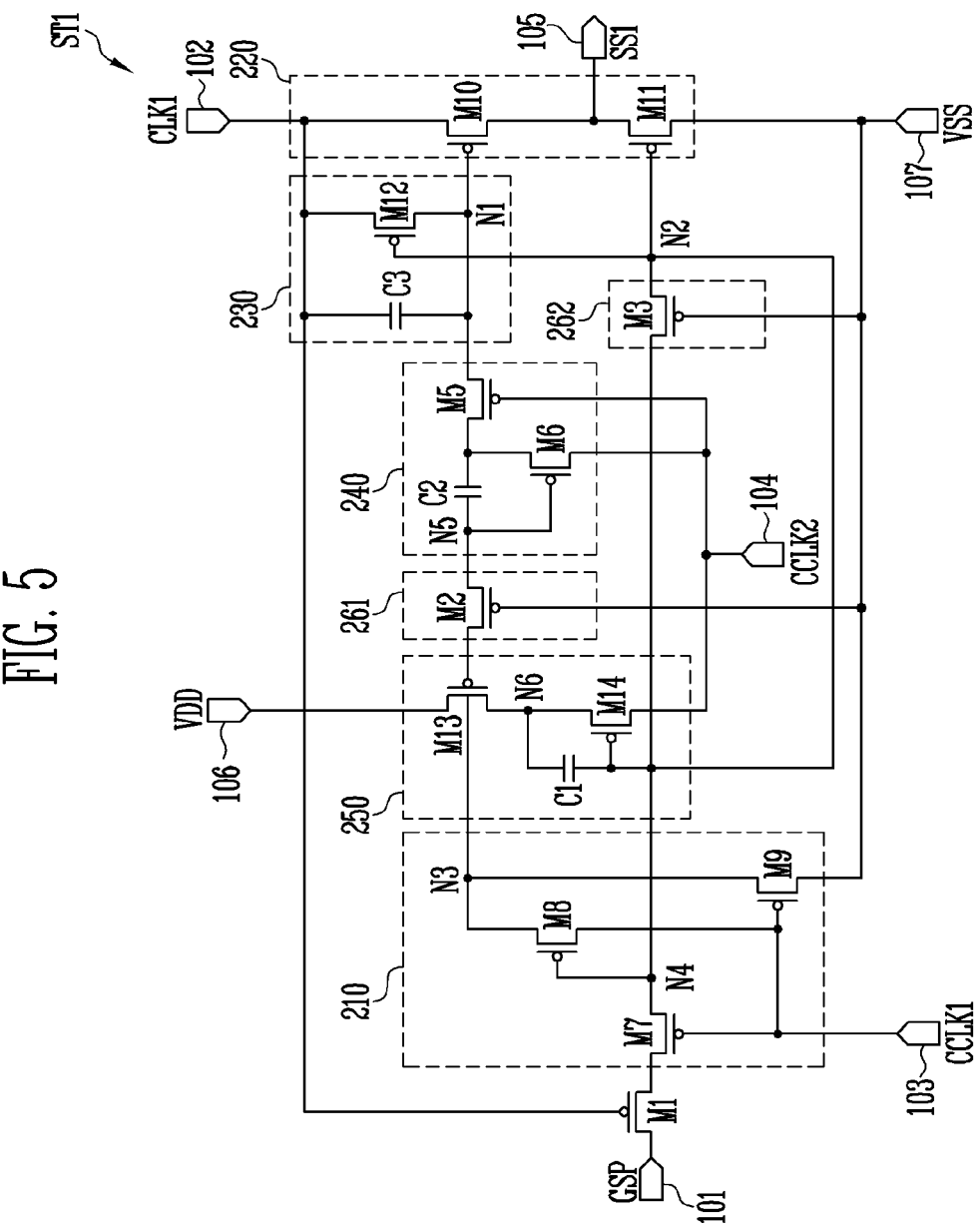
FIG. 5 is a drawing illustrating an exemplary embodiment of a stage shown in FIG. 3.

FIG. 5 is a drawing illustrating an exemplary embodiment of a stage shown in FIG. 3. FIG. 5 shows the first stage ST1 for convenience of description.

Referring to FIG. 5, the i-th stage ST1 according to an exemplary embodiment of the present invention includes a first transistor M1, an input circuit 210, an output circuit 220, a first signal processing circuit 230, a second signal processing circuit 240, a third signal processing circuit 250, a first stabilization circuit 261 and a second stabilization circuit 262.

A first electrode of the first transistor M1 is connected to a first input terminal 101 and a second electrode of the first transistor M1 is connected to the input circuit 210. A gate electrode of the first transistor M1 is connected to a second input terminal 102. The first transistor M1 is turned on when the first clock signal CLK1 is not supplied to the second input terminal 102 to connect electrically the first input terminal 101 and the input circuit 210 to each other.

The first transistor M1 controls the scan signals output from the second scan lines S21 to S2n to overlap each other during a predetermined period. That is, the first transistor M1 is turned off when the first clock signal CLK1 is supplied to the second input terminal 102. If the first transistor M1 is turned off, a voltage of the second node N2 may be prevented from dropping due to low voltage of the first input terminal 101 while the first clock signal CLK1 is supplied to the output terminal 105 (i.e., when the scan signal SS1 is output).

The output circuit 220 is connected to the second input terminal 102 and a second power input terminal 107 and electrically connects the second input terminal 102 or the second power input terminal 107 to the output terminal 105 corresponding to the voltage of the first node N1 and the second node N2. For this purpose, the output circuit 220 includes a tenth transistor M10 and an eleventh transistor M11.

A tenth transistor M10 is connected between the second input terminal 102 and the output terminal 105. A gate electrode of the tenth transistor M10 is connected to the first node N1. This tenth transistor M10 is turned on or turned off in response to the voltage of the first node N1. Here, when the tenth transistor M10 is turned on, the voltage of the first power VDD supplied to the output terminal 105 is used as a control signal of the second scan line S21.

An eleventh transistor M11 is connected between the output terminal 105 and the second power input terminal 107. A gate electrode of the eleventh transistor M11 is connected to the second node N2. The eleventh transistor M11 is turned on or turned off in response to the voltage of the second node N2.

The input circuit 210 controls a voltage of a third node N3 and a fourth node N4 corresponding to a signal supplied to the first input terminal 101 connected via the first transistor M1 and the third input terminal 103. For this purpose, the input circuit 210 has a seventh transistor M7 to a ninth transistor M9.

The seventh transistor M7 is connected between the second electrode of the first transistor M1 and the fourth node N4. A gate electrode of the seventh transistor M7 is connected to the third input terminal 103. The seventh transistor M7 is turned on when the first control clock signal CCLK1 is supplied to the third input terminal 103 to connect electrically the first transistor M1 and the fourth node N4.

An eighth transistor M8 is connected between the third node N3 and the third input terminal 103. A gate electrode of the eighth transistor M8 is connected to the fourth node N4. The eighth transistor M8 is turned on or turned off in response to the voltage of the fourth node N4.

A ninth transistor M9 is connected between the third node N3 and the second power input terminal 107. A gate electrode of the ninth transistor M9 is connected to the third input terminal 103. The ninth transistor M9 is turned on when the first control clock signal CCLK1 is supplied to the third input terminal 103 to supply the voltage of a second power VSS to the third node N3.

The first signal processing circuit 230 controls the voltage of the first node N1 corresponding to the voltage of the second node N2. For this purpose, the first signal processing circuit 230 includes a twelfth transistor M12 and a third capacitor C3.

The twelfth transistor M12 is connected between the second input terminal 102 and the first node N1. A gate electrode of the twelfth transistor M12 is connected to the second node N2.

This twelfth transistor M12 is turned on or turned off in response to the voltage of the second node N2. The third capacitor C3 is connected between the second input terminal 102 and the first node N1.

The third capacitor C3 charges the voltage applied to the first node N1. In addition, the third capacitor C3 maintains the voltage of the first node N1 stable.

On the other hand, when the second node N2 is set to low voltage, the twelfth transistor M12 is set to a turn-on state. When the twelfth transistor M12 is set to the turn-on state, the second input terminal 102 is electrically connected to the first node N1, so that the voltage of the first node N1 is set to the voltage of the second input terminal 102. Therefore, the twelfth transistor M12 is set to the turn-on state, a voltage of a gate electrode of the tenth transistor M10 and the first electrode are set to the same voltage, and therefore the tenth transistor M10 is set to a turn-off state.

The second signal processing circuit 240 is connected to the fifth node N5 and controls the voltage of the first node N1 corresponding to the second control clock signal CCLK2 supplied to the fourth input terminal 104. For this purpose, the second signal processing circuit 240 includes a fifth transistor M5, a sixth transistor M6, and a second capacitor C2.

A first terminal of the second capacitor C2 is connected to the fifth node N5, and a second terminal of the second capacitor C2 is connected to the fifth transistor M5.

The fifth transistor M5 is connected between the second terminal of the second capacitor C2 and the first node N1. A gate electrode of the fifth transistor M5 is connected to the fourth input terminal 104. The fifth transistor M5 is turned on when the second control clock signal CCLK2 is supplied to the fourth input terminal 104 to connect electrically the second terminal of the second capacitor C2 to the first node N1.

The sixth transistor M6 is connected between the second terminal of the second capacitor C2 and the fourth input terminal 104. A gate electrode of the sixth transistor M6 is connected to the fifth node N5. The sixth transistor M6 is turned on or turned off in response to the voltage of the fifth node N5.

The third signal processing circuit 250 is connected to the first power input terminal 106 and the fourth input terminal 104 and controls a voltage of a sixth node N6 corresponding to the voltage of the second node N2 and the third node N3. For this purpose, the third signal processing circuit 250 includes a thirteenth transistor M13, a fourteenth transistor M14, and a first capacitor C1.

The first capacitor C1 is connected between the sixth node N6 and the second node N2. The first capacitor C1 stores the voltage corresponding to the second node N2.

The thirteenth transistor M13 is connected between the first power input terminal 106 and the sixth node N6. The thirteenth transistor M13 is turned on or turned off in response to the voltage of the third node N3 to control an electrical connection between the first power input terminal 106 and the sixth node N6.

The fourteenth transistor M14 is connected between the sixth node N6 and the fourth input terminal 104. The fourteenth transistor M14 is turned on or off in response to the voltage of the second node N2 to control electrical connections between the sixth node N6 and the fourth input terminal 104.

On the other hand, the sixth node N6 included in the third signal processing circuit 250 periodically receives the second control clock signal CCLK2 from the fourth input terminal 104 when the second node N2 is set to low voltage. When the second control clock signal CCLK2 is supplied to the sixth node N6, the voltage of the second node N2 periodically drops to lower voltage than low voltage (e.g., VSS) due to a coupling of the first capacitor C1. Thus, when the voltage of the second node N2 drops periodically, driving characteristics of the transistors M11, M12, and M14 connected to the second node N2 are improved (when the low voltage is periodically supplied to a gate electrode of the PMOS transistor, driving characteristics may be improved.)

In addition, the third signal processing circuit 250 supplies the voltage of the first power VDD to the sixth node N6 when the third node N3 is set to low voltage. When the first power VDD voltage is supplied to the sixth node N6, the voltage of the second node N2 may be stably maintained by coupling the first capacitor C1.

The first stabilization circuit 261 is connected between second signal processing circuit 240 and input circuit 210, and the second stabilization circuit 262 is connected between the second signal processing circuit 240 and the first signal processing circuit 230. The first stabilization circuit 261 and the second stabilization circuit 262 limit a voltage drop of the second node N2, the third node N3, and the fourth node N4. For this purpose, the first stabilization circuit 261 has the second transistor M2, and the second stabilization circuit 262 has the third transistor M3.

The second transistor M2 is connected between the third node N3 and the fifth node N5. A gate electrode of the second transistor M2 is connected to the second power input terminal 107. The second transistor M2 is set to the turn-on state.

The third transistor M3 is connected between the second node N2 and the fourth node N4. A gate electrode of the third transistor M3 is connected to the second power input terminal 107. The third transistor M3 is set to the turn-on state.

In an exemplary embodiment, each of the first transistor M1 to the fourteenth transistor M14 described above is a P-type transistor. That is, the stage ST according to an exemplary embodiment of the present invention is formed of a P-type transistor and supplies high voltage as a scan signal SS.

Figure 6:
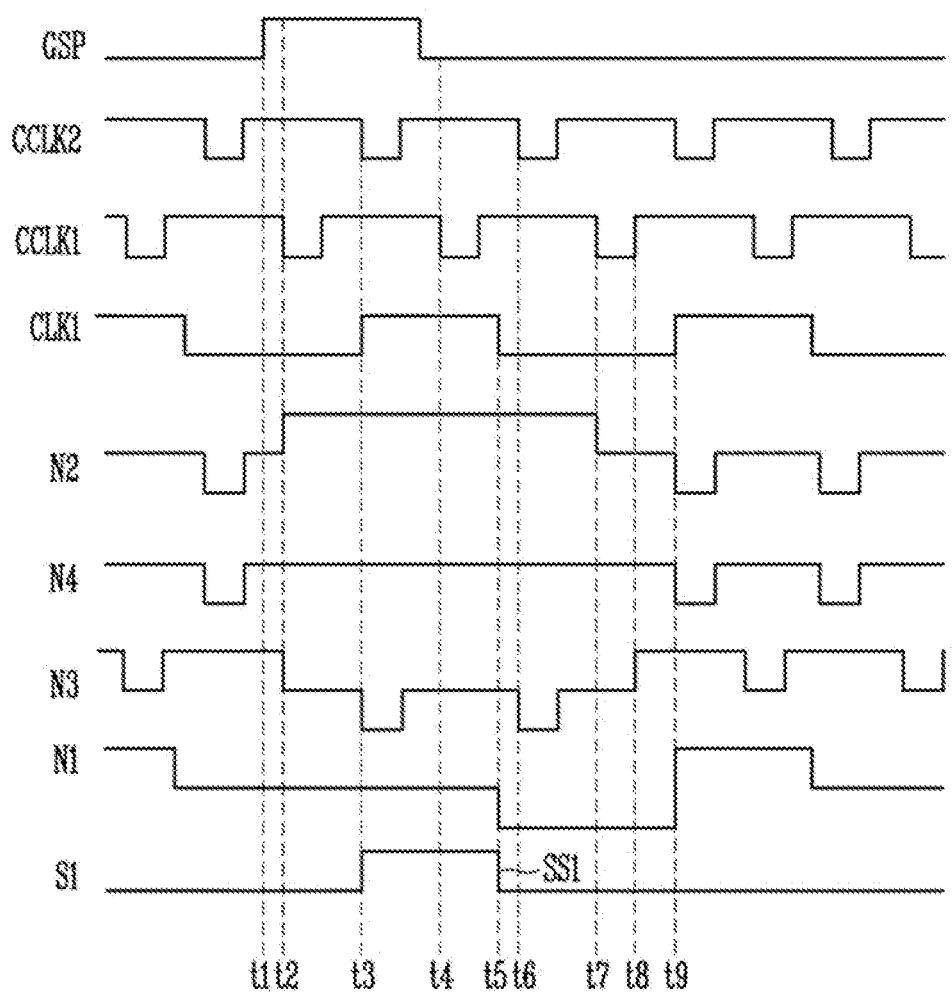
FIG. 6 is a drawing illustrating an exemplary embodiment of a driving method of a stage shown in FIG. 3.

FIG. 6 is a drawing illustrating an exemplary embodiment of a driving method of a stage shown in FIG. 3. FIG. 6 shows an operation procedure using a first stage ST1 for convenience of description.

Referring to FIG. 6, the first control clock signal CCLK1 and the second control clock signal CCLK2 have a cycle of two horizontal periods 2H and are supplied to different horizontal periods. In other words, the second control clock signal CCLK2 is set to a signal shifted by half a cycle (i.e., one horizontal period 1H) from the first control clock signal CCLK1.

In FIG. 5, when the gate start pulse GSP is supplied, the first input terminal 101 may be set to the voltage of the first power VDD, and when the gate start pulse GSP is not supplied, the first input terminal 101 may be set to the voltage of the second power VSS. In addition, when the control clock signals CCLK1 and CCLK2 are supplied, the third input terminal 103 and the fourth input terminal 104 may be set to the voltage of the second power VSS, and when the control clock signals CCLK1 and CCLK2 are supplied, the third input terminal 103 and the fourth input terminal 104 may be set to the voltage of the first power VDD. Similarly, when the clock signal CLK1 is supplied, the second input terminal 102 may be set to the voltage of the second power VSS, and when the clock signal CLK1 is not supplied, the second input terminal 102 may be set to the voltage of the first power VDD.

The gate start pulse GSP supplied to the first input terminal 101 is set to overlap at least once with the first control clock signal CCLK1 supplied to the third input terminal 103.

First, the gate start pulse GSP is supplied to the first input terminal 101 at the first time t1. At this time, since the first transistor M1 is set to the turn-on state, the gate start pulse GSP supplied to the first input terminal 101 is supplied to the seventh transistor M7.

At the second time t2, the first control clock signal CCLK1 is supplied to the third input terminal 103. When the first control clock signal CCLK1 is supplied to the third input terminal 103, the seventh transistor M7 and the ninth transistor M9 are turned on.

When seventh transistor M7 is turned on, the first input terminal 101 and the fourth node N4 are electrically connected. Here, since the third transistor M3 maintains the turn-on state by the supply of the voltage of the second power VSS, the first input terminal 101 is also electrically connected to the second node N2 via the fourth node N4. Then, the fourth node N4 and the second node N2 are set to high voltage by the gate start pulse GSP supplied to the first input terminal 101. When the fourth node N4 and the second node N2 are set to high voltage, the eighth transistor M8, the eleventh transistor M11, the twelfth transistor M12 and the fourteenth transistor M14 are turned off.

When the ninth transistor is turned on, the voltage of the second power VSS is supplied to the third node N3. In addition, since the second transistor M2 maintains the turn-on state by the supply of the voltage of the second power VSS, the voltage of the second power VSS is supplied to the fifth node N5. When the voltage of the second power VSS is supplied to the third node N3, the thirteenth transistor M13 is turned on. When the voltage of the second power VSS is supplied to the fifth node N5, the sixth transistor M6 is turned on.

When the thirteenth transistor M13 is turned on, the voltage of the first power VDD is supplied to the fourteenth transistor M14. At this time, the fourteenth transistor M14 is set to the turn-off state, and the voltage corresponding to the turn-off of the fourteenth transistor M14 is charged in the first capacitor C1.

When the sixth transistor M6 is turned on, the second terminal of the second capacitor C2 is electrically connected to the fourth input terminal 104. At this time, since the fifth transistor M5 is set to the turn-off state, the first node N1 maintains the voltage of the previous period.

At the third time t3, the first clock signal CLK1 is supplied to the second input terminal 102, and the second control clock signal CCLK2 is supplied to the fourth input terminal 104.

When the second control clock signal CCLK2 is supplied to the fourth input terminal 104, the second control clock signal CCLK2 is supplied to the second terminal of the second capacitor C2 via the sixth transistor M6. Then, the voltage of the third node N3 is reduced to a voltage lower than the second power VSS by a coupling of the second capacitor C2. Then, the sixth transistor M6 stably turns on, and the driving characteristics may be improved simultaneously.

When the second control clock signal CCLK2 is supplied to the fourth input terminal 104, the fifth transistor M5 is turned on. When the fifth transistor M5 is turned on, the second control clock signal CCLK2 is supplied to the first node N1. In this case, the first node N1 is set to low voltage, so that the tenth transistor M10 is turned on. At this time, the twelfth transistor M12 is maintained in the turn-off state by the high voltage of the second node N2.

When the tenth transistor M10 is turned on, the first clock signal CLK1 supplied to the second input terminal 102 is supplied to the output terminal 105. The first clock signal CLK1 supplied to the output terminal 105 is supplied to the first second scan line S21 as the scan signal SS1.

In addition, when the first clock signal CLK1 is supplied to the second input terminal 102, the first transistor M1 is turned off. When the first transistor M1 is turned off, an electrical connection between the first input terminal 101 and the seventh transistor M7 is cut off.

At the fourth time t4, the first control clock signal CCLK1 is supplied to the third input terminal 103. When the first control clock signal CCLK1 is supplied to the third input terminal 103, the seventh transistor M7 and the ninth transistor M9 are turned on. When the ninth transistor M9 is turned on, the voltage of the second power VSS is supplied to the third node N3.

When seventh transistor M7 is turned on, the first transistor M1 and the second node N2 are electrically connected. At this time, since the first transistor M1 is set to the turn-off state, the second node N2 stably maintains high voltage.

At the fifth time t5, a supply of the first clock signal CLK1 to the second input terminal 102 stops. When the supply of the first clock signal CLK1 stops, the voltage of the second input terminal 102 drops from high voltage to low voltage.

Then, the voltage of the first node N1 drops by a coupling of the third capacitor C3, so that the tenth transistor M10 maintains the turn-on state. When the tenth transistor M10 is maintained in the turn-on state, the low voltage supplied to the second input terminal 102 is supplied to the output terminal 105. That is, a supply of the scan signal SS1 stops at the fifth time T5.

At the sixth time t6, the second control clock signal CCLK2 is supplied to the fourth input terminal 104. When the second control clock signal CCLK2 is supplied to the fourth input terminal 104, the second control clock signal CCLK2 is supplied to the second terminal of the second capacitor C2 via the sixth transistor M6. Then, the voltage of the third node N3 drops to the voltage lower than the second power VSS by a coupling of the second capacitor C2.

In addition, when the second control clock signal CCLK2 is supplied to the fourth input terminal 104, the fifth transistor M5 is turned on. When the fifth transistor M5 is turned on, the second control clock signal CCLK2 is supplied to the first node N1. In this case, the first node N1 maintains low voltage, so that the tenth transistor M10 stably maintains the turn-on state.

At the seventh time t7, the first control clock signal CCLK1 is supplied to the third input terminal 103. When the first control clock signal CCLK1 is supplied to the third input terminal 103, the seventh transistor M7 and the ninth transistor M9 are turned on. When the ninth transistor M9 is turned on, the voltage of the second power VSS is supplied to the third node N3.

On the other hand, at the seventh time t7, the first clock signal CLK1 is not supplied to the second input terminal 102, so that the first transistor M1 maintains the turn-on state. Therefore, when the seventh transistor M7 is turned on, low voltage supplied to the first input terminal 101 is supplied to the second node N2.

When low voltage is supplied to the second node N2, the eighth transistor M8, the eleventh transistor M11, the twelfth transistor M12 and the fourteenth transistor M14 are turned on.

When the eighth transistor M8 is turned on, the voltage of the second power VSS is supplied to the second node N2 from the third node N3. That is, the second node N2 maintains low voltage.

When the fourteenth transistor M14 is turned on, the fourth input terminal 104 and the sixth node N6 are electrically connected.

When the twelfth transistor M12 is turned on, the first node N1 and the second input terminal 102 are electrically connected. At this time, the second input terminal 102 is set to low voltage, so that the first node N1 is set to low voltage.

When the eleventh transistor M11 is turned on, the voltage of the second power VSS is supplied to the output terminal 105.

At the eighth time t8, a supply of the first control clock signal CCLK1 to the third input terminal 103 stops. That is, the third input terminal 103 rises from low voltage to high voltage. At this time, since the eighth transistor M8 is set to the turn-on state, the third node N3 rises to high voltage. When the voltage of the third node N3 rises, the thirteenth transistor M13 and the sixth transistor M6 are turned off.

At the ninth time t9, the second control clock signal CCLK2 is supplied to the fourth input terminal 104, and the first clock signal CLK1 is supplied to the second input terminal 102.

When the second control clock signal CCLK2 is supplied to the fourth input terminal 104, the second control clock signal CCLK2 is supplied to the sixth node N6. Then, the voltage of the second node N2 drops by a coupling of the first capacitor C1. That is, the voltage of the second node N2 drops to the voltage lower than the second power VSS. As the second node N2 drops to the voltage lower than the second power VSS, a driving of the transistors M11, M12, and M14 connected to the second node N2 is stably maintained. In particular, since low voltage is supplied to a gate electrode of the twelfth transistor M12, the twelfth transistor M12 stably maintains the turn-off state, so that no noise due to leakage current output to the output terminal 105 and the scan signal SS1 may maintain an inactive state.

On the other hand, since the twelfth transistor M12 maintains the turn-on state at the ninth time t9, the first clock signal CLK1 supplied to the second input terminal 102 is supplied to the first node N1, so that the first node N1 rises to the high voltage. When the first node N1 is set to the high voltage, the tenth transistor M10 is turned off. Therefore, regardless of the first clock signal CLK1 supplied to the second input terminal 102, the output terminal 105 maintains the voltage of the second power VSS.

Actually, a stage ST according to an exemplary embodiment of the present invention outputs the scan signal SS1 to the output terminal 105 while repeating the above process. The second stage ST2, which receives the scan signal from the output terminal 105 of the first stage ST1, also outputs the scan signal while repeating the above process.

Figure 7:
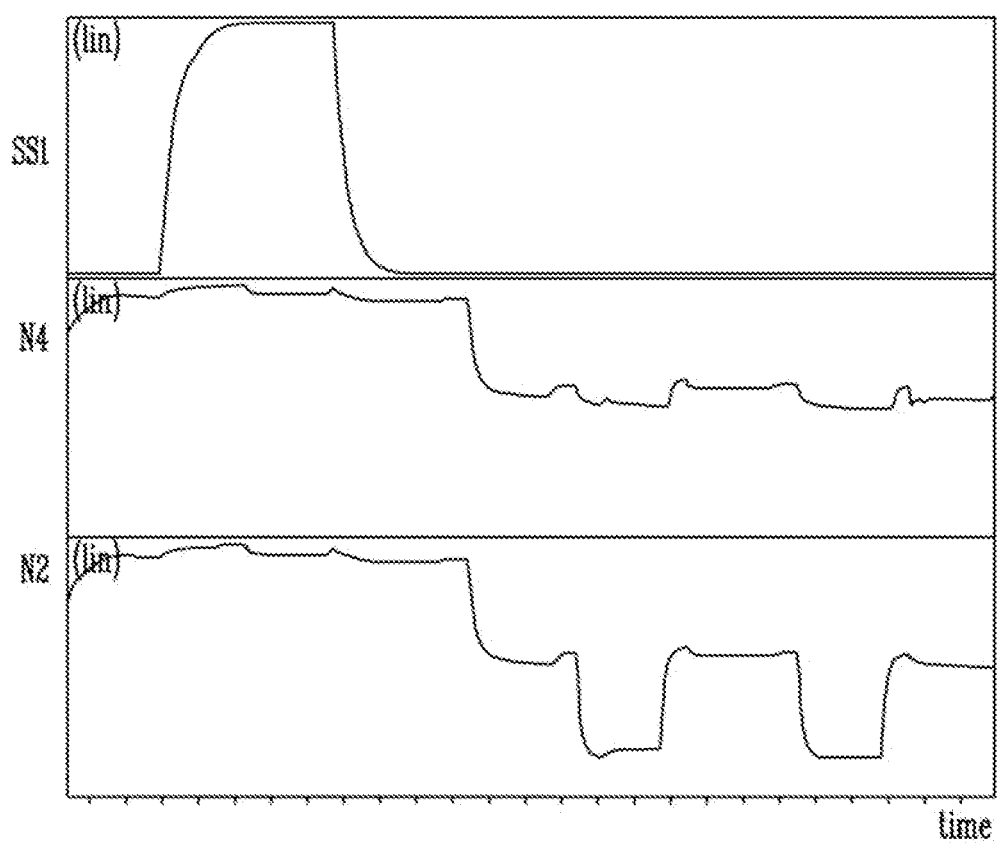
FIG. 7 is a drawing illustrating a simulation result of a stage according to an exemplary embodiment of the present invention.

FIG. 7 is a drawing illustrating a simulation result of a stage according to an exemplary embodiment of the present invention, in which scan signal SS1, the voltage at node N4, and the voltage at node N2 are plotted over time. It is assumed the stage is the first stage ST1 in FIG. 7.

Referring to FIGS. 5 to 7, the first stage ST1 of the present invention outputs the scan signal SS1 to the first second scan line S21 in response to the gate start pulse GSP. That is, the first stage ST1 of the present invention may output the scan signal SS1 stably in response to the control clock signals CCLK1 and CCLK2 and the clock signal CLK1.

In addition, since the first stage ST1 of the present invention is formed of P-type transistors, a noise signal is not generated during the period when the output of the scan signal SS1 stops, and an influence of an output load may be reduced by blocking a noise signal which can be amplified largely according to a load influence on the output terminal 105.

Figure 8:
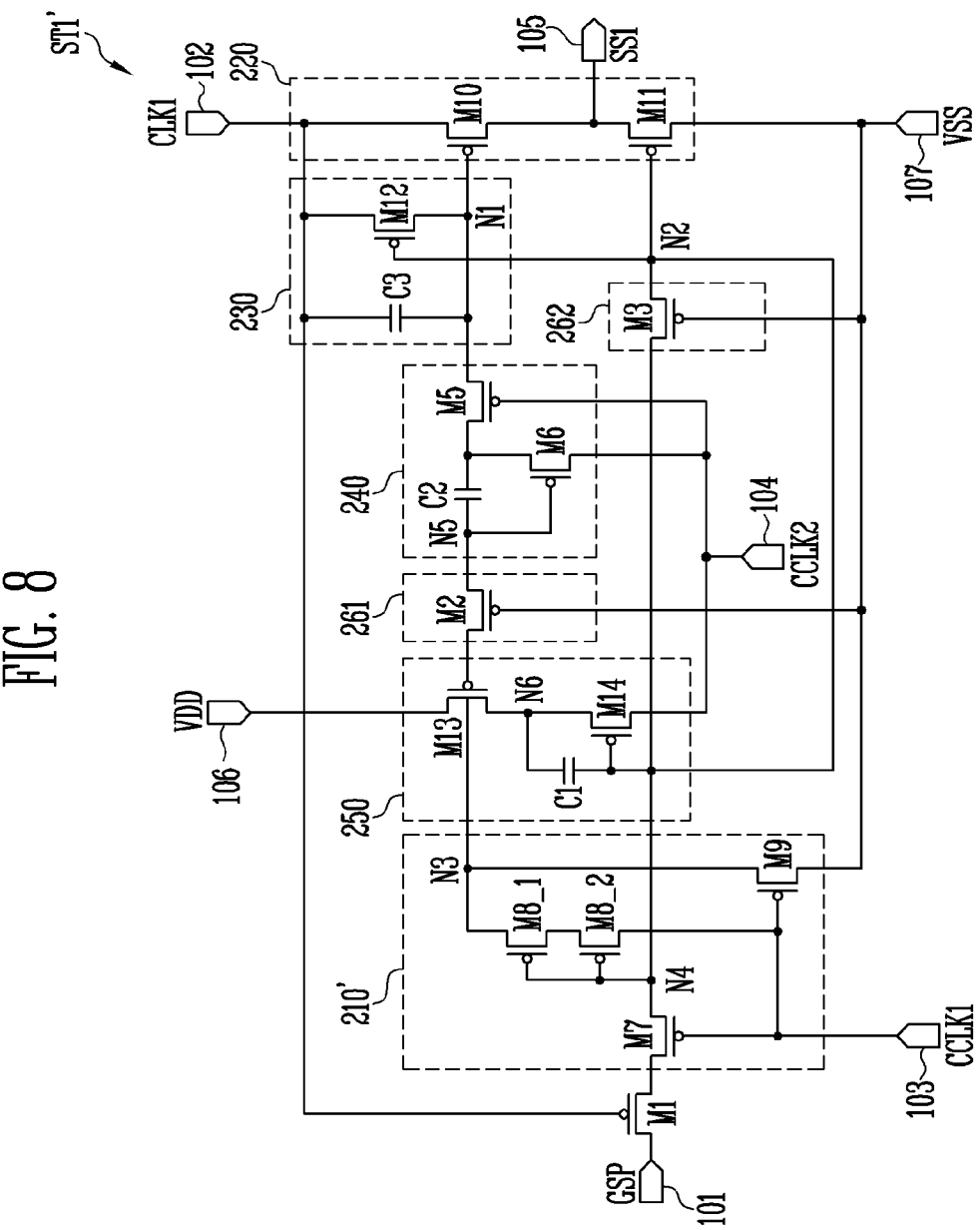
FIG. 8 is a drawing illustrating a stage according to another exemplary embodiment of the present invention.

FIG. 8 is a drawing illustrating a stage according to another exemplary embodiment of the present invention. In FIG. 8, the same reference numerals are assigned to the same components as those in FIG. 5, and a detailed description thereof will be omitted.

Referring to FIG. 8, a first stage ST1' according to another exemplary embodiment of the present invention includes an input circuit 210, an output circuit 220, a first signal processing circuit 230, a second signal processing circuit 240, a third signal processing circuit 250, a first stabilization circuit 261, and a second stabilization circuit 262.

The input circuit 210' controls the voltage of the third node N3 and the fourth node N4 corresponding to a signal supplied to the first input terminal 101 and the second input terminal 102. For this purpose, the input circuit 210 has the seventh transistor M7 to the ninth transistor M9.

The seventh transistor M7 is connected between the first input terminal 101 and the fourth node N4. A gate electrode of the seventh transistor M7 is connected to the second input terminal 102. The seventh transistor M7 is turned on when the first clock signal CLK1 is supplied to the second input terminal 102 to connect electrically the first input terminal 101 to the fourth node N4.

A plurality of eighth transistors M8_1 and M8_2 are connected in series between the third node N3 and the second input terminal 102. Gate electrodes of the eighth transistors M8_1 and M8_2 are connected to the fourth node N4. These eighth transistors M8_1 and M8_2 are turned on or off in response to the voltage of the fourth node N4.

The ninth transistor M9 is connected between the third node N3 and the second power input terminal 107. A gate electrode of the ninth transistor M9 is connected to the second input terminal 102. The ninth transistor M9 is turned on when the first clock signal CLK1 is supplied to the second input terminal 102 to supply the voltage of the second power VSS to the third node N3.

In another exemplary embodiment of the present invention, the configuration except for forming a plurality of eighth transistors M8_1 and M8_2 to minimize the leakage current is the same as the configuration of FIG. 5. Therefore, a detailed description of the operation process will be omitted.

A stage according to exemplary embodiments of the present invention and a scan driver including the same may supply a scan signal using a stage formed of P-type transistors and may prevent an output of an unwanted noise in a period where the scan signal is not supplied.

In addition, a stage according to the exemplary embodiments of the present invention and a scan driver including the same may prevent a degradation of specific transistors.

In addition, a stage according to an exemplary embodiment of the present invention and a scan driver including the same may maintain a voltage of the specific node constant during a supply of a scan signal, thereby ensuring drive reliability.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A stage comprising:
   an output circuit connected to a second input terminal, a second power input terminal, an output terminal, a first node, and a second node;
   an input circuit connected to a first input terminal, a third input terminal, the second power input terminal, third node, and a fourth node;
   a first signal processing circuit connected to the second input terminal, the first node, and the second node;
   a second signal processing circuit connected to a fourth input terminal, the first node, and a fifth node;
   a third signal processing circuit connected to a first power input terminal, the fourth input terminal, the third node, and the fourth node;
   a first stabilization circuit connected to the second power input terminal, the third node, and the fifth node; and
   a second stabilization circuit connected to the second power input terminal, the second node, and the fourth node.

2. The stage of claim 1, wherein transistors included in the output circuit, the input circuit, the first signal processing circuit, the second signal processing circuit, the third signal processing circuit, the first stabilization circuit, and the second stabilization circuit are P-type transistors.

3. The stage of claim 1, wherein the first stabilization circuit comprises a second transistor connected between the third node and the fifth node and comprising a gate electrode connected to the second power input terminal.

4. The stage of claim 1, wherein the second stabilization circuit comprises a third transistor connected between the second node and the fourth node and comprising a gate electrode connected to the second power input terminal.

5. The stage of claim 1, wherein the input circuit comprises:
   a seventh transistor connected between the first input terminal and the fourth node and comprising a gate electrode connected to the third input terminal; and
   a ninth transistor connected between the third node and the second power input terminal and comprising a gate electrode connected to the third input terminal.

6. The stage of claim 1, wherein the output circuit comprises:
   a tenth transistor connected between the second input terminal and the output terminal and comprising a gate electrode connected to the first node; and
   an eleventh transistor connected between the second power input terminal and the output terminal and comprising a gate electrode connected to the second node.

7. The stage of claim 1, wherein the first signal processing circuit comprises a twelfth transistor connected between the second input terminal and the first node and comprising a gate electrode connected to the second node.

8. The stage of claim 7, wherein the first signal processing circuit further comprises a third capacitor connected between the second input terminal and the first node.

9. The stage of claim 1, wherein the second signal processing circuit comprises:
   a fifth transistor comprising a first electrode connected to the first node and a gate electrode connected to the fourth input terminal; and
   a sixth transistor connected between a second electrode of the fifth transistor and the fourth input terminal and comprising a gate electrode connected to the fifth node.

10. The stage of claim 9, wherein the second signal processing circuit further comprises a second capacitor connected between the fifth node and the second electrode of the fifth transistor.

11. The stage of claim 1, wherein the third signal processing circuit comprises:
   a thirteenth transistor connected between the first power input terminal and a sixth node and comprising a gate electrode connected to the third node; and
   a fourteenth transistor connected between the fourth input terminal and the sixth node.

12. The stage of claim 11, wherein the third signal processing circuit further comprises a first capacitor connected between the sixth node and a gate electrode of the fourteenth transistor.

* * * * *